United States Patent [19]
Stöhr

[11] 3,923,442
[45] Dec. 2, 1975

[54] APPARATUS FOR THE PRODUCTION OF THERMOPLASTIC ARTICLES WITH BURDOCK-LIKE HOOKS

[76] Inventor: Arno Stöhr, Bamberger Strasse 6, 8641 Neuses, Bavaria, Germany

[22] Filed: Aug. 10, 1973

[21] Appl. No.: 387,366

[30] Foreign Application Priority Data
Aug. 11, 1972 Germany............................ 2239559

[52] U.S. Cl.................................. 425/309; 264/145
[51] Int. Cl.².............................................. A01N 9/20
[58] Field of Search ........... 425/308, 309, 311, 313; 264/145, 150, 151, 154, 177 R, 299

[56] References Cited
UNITED STATES PATENTS

| | | | |
|---|---|---|---|
| 3,329,998 | 7/1967 | Stöhr ................................ | 264/145 |
| 3,387,069 | 6/1968 | Stöhr ................................ | 425/308 |
| 3,594,863 | 7/1971 | Erb ................................ | 264/177 X |
| 3,594,865 | 7/1971 | Erb ................................ | 264/177 X |
| 3,781,398 | 12/1973 | Erb ................................ | 264/150 |

*Primary Examiner*—Al Lawrence Smith
*Assistant Examiner*—Robert C. Watson
*Attorney, Agent, or Firm*—Kenneth S. Goldfarb

[57] ABSTRACT

An apparatus for the production of thermoplastic articles with bristles or spikes. The apparatus performs the steps of extruding a profile form, particularly with a rod-, tube- or ribbon-like carrier, having a plurality of longitudinal ribs tapering outwardly and ending in thin hooked portions, repeatedly cutting said ribs transversely to the extruding direction while still in a plastic state, simultaneously stretching the profile form so as to form bristles or spikes with hooked ends, cooling the extruded form, and cutting it into articles of desired length.

4 Claims, 4 Drawing Figures

APPARATUS FOR THE PRODUCTION OF THERMOPLASTIC ARTICLES WITH BURDOCK-LIKE HOOKS

The present invention is related to the production of thermoplastic articles with burdock hooks which are needed for different purposes, e.g. hair curler or dress fasteners. On hair curlers, the hooks stick to the hair to prevent uncoiling of the curler.

Heretofore, the artificial burdock hooks were produced in a very complicated manner. Loops of plastic threads were, at their base, woven into a textile ribbon or molten into a plastic ribbon. Thereafter, the loops were cut to form the hooks. This procedure is in itself very expensive, and an additional stage of manufacture is necessary, e.g. the ribbons must be wound on a tubular curler and mounted thereon. Curlers of this kind have the further disadvantage that the textile of plastic ribbon bearing the hooks is obstructing the passage of air. Therefore, the coiled hair dries very slowly. The introduction of such curlers on the market is marred by the high production costs and the resulting price.

Furthermore, the process of the prior art has the disadvantage that the hooks comprise only one half of the loop arch. The hooks are therefore defective because they do not actually have the form and effect of a hook. The gripping effect is thus limited. Another essential drawback is that the acute ends of the hooks are likely to pierce the head skin.

It is an essential object of the invention to avoid these and other disadvantages and provide a method and apparatus for economically producing thermoplastic articles with burdock hooks which meet the requirements mentioned above.

The new method is based on extrusion processes as described in detail in U.S. Pat. Nos. 3,329,998 and 3,387,069. According to that processes, thermoplastic rod-, tube-or ribbon-like profile forms with a plurality of longitudinal ribs are extruded and, while still in a plastic state, stretched in extruding direction, cut by blades transversely to that direction from one or two sides, and finally cooled down and cut into desired lengths.

According to the invention, the extruded form is provided with ribs tapering outwardly and ending in thin hooked portions. Preferably, pairs of adjacent hooked portions are bent against each other. The extruder die is designed accordingly.

Further objects and features of the invention will become apparent from the description of a preferred embodiment for the production of hair curlers with reference to the accompanying drawing, in which FIG. 1 shows schematically an extruder die and blade arrangement;

Figure 1:
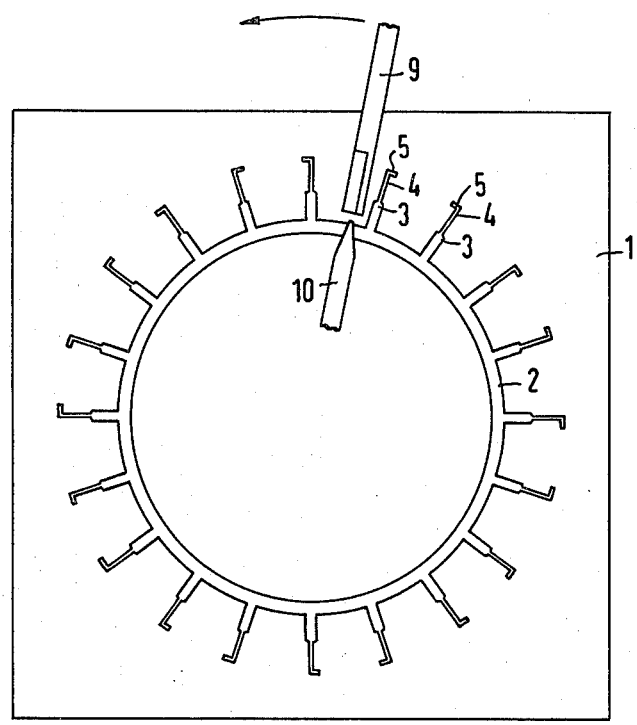

As shown in FIG. 1, the die 1 of an extruder (not shown) has a circular opening 2 to produce a tubular extruded form. Slits 3 are regularly distributed over the circumference of the opening 2. The slits taper radially into thin slits 4 with hooked ends 5. An extruder suited for purposes of the invention is shown and described in U.S. Pat. No. 3,387,069. For the purposes of the invention, such an extruder is to be equipped with a die as shown in FIG. 1 of the present application.

Figure 2:
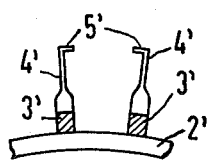
FIG. 2 shows a detail of the extruded form in cross section.

The extruded form 2' (FIG. 2) has longitudinal ribs 3' tapering radially at 4' into hooked ends 5'. Pairs of adjacent hooked ends are bent against each other.

Figure 3:
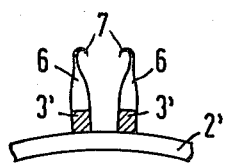
FIG. 3 shows the same detail after cutting transversely to the extruding direction.

The blade 9 (FIG. 1), when revolving in direction of the arrow, cuts repeatedly into the ribs 3' with the tapering hooked ends 4', 5', while still in plastic state, to form bristles 6 with burdock hooks 7 (FIG. 3), the tips of which slightly retract due to internal stress of the plastic material. The blade 9 does not quite reach the foot level of the ribs, leaving a remnant 3' which is stretched to produce the desired longitudinal distance between the bristles. The stretching may be performed as shown in U.S. Pat. No. 3,387,069 mentioned previously, by means of drawing rolls as illustrated in FIG. 1 of the patent and specifically, reference numerals 9 and 10.

Figure 4:
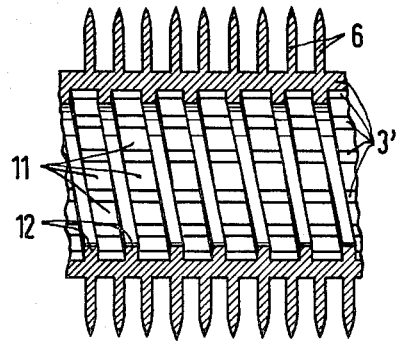
FIG. 4 shows a longitudinal section of a portion of a hair curler made by the new process.

FIG. 4 shows the extruded form after having been cut from the inside by a revolving blade 10 (FIG. 1) to form a plurality of openings 11 and a continuous helix 12 supporting the remnants 3' of the ribs.

While the invention has been shown and explained as applied to the production of tubular forms, it will be apparent to anyone skilled in the art that it is equally applicable to any other profile, particularly to flat profiles for the production of burdock ribbons.

I claim:

1. Apparatus for the production of thermoplastic articles with hooks, comprising means for extruding a profile form and longitudinal ribs, particularly with a rod-, tube- or ribbon-like carrier, said means including an extruder die having a circular opening for producing a tubular extruded form, a plurality of slits regularly distributed over the circumference of said circular opening, said slits tapering outwardly in cross-section and ending in thin hooked portions forming said longitudinal ribs, means for repeatedly cutting said ribs transversely to the extruding direction while still in a plastic state and means for simultaneously stretching said profile form in extruding direction so as to form separate hooks, means for cooling said extruded form, and means for cutting it into articles of desired length.

2. Apparatus according to claim 1, said cutting means being positioned to cut said longitudinal ribs to a depth slightly above the circumference of said circular opening.

3. Apparatus according to claim 1, pairs of adjacent hooked end portions facing each other.

4. Apparatus according to claim 1 further including a second rotatable cutting means for cutting through said tubular form from the inside transversely to the extruding direction to form a continuous helix.

* * * * *